(No Model.)

J. R. McALISTER.
VEHICLE HUB.

No. 423,265. Patented Mar. 11, 1890.

WITNESSES:
Percy C. Bowen.

INVENTOR
James R. McAlister
By Edson Bros.
Attorneys.

UNITED STATES PATENT OFFICE.

JAMES R. McALISTER, OF ROSSIE, NEW YORK.

VEHICLE-HUB.

SPECIFICATION forming part of Letters Patent No. 423,265, dated March 11, 1890.

Application filed September 23, 1889. Serial No. 324,771. (No model.)

*To all whom it may concern:*

Be it known that I, JAMES R MCALISTER, a citizen of the United States, residing at Rossie, in the county of St. Lawrence and State of New York, have invented certain new and useful Improvements in Spoke-Seats; and I do hereby declare the following to be a full, clear, and exact description of the invention, such as will enable others skilled in the art to which it appertains to make and use the same.

My invention relates to improvements in spoke-seats; and the object of the same is to provide means for strengthening the joint between the spoke and hub, as well as to impart a neat finish thereto.

With these objects in view, and such others as pertain to my invention, it consists of a metallic seat which is firmly secured exteriorly to the hub, and is fitted around the spoke at the point where the tenon is formed thereon to compensate for the reduction of material in the spoke formed by the tenon, to strengthen the spoke at its weakest point and impart a finish to the joint between the hub and spoke. Instead of forming the tenon abruptly on the spoke, as in the ordinary manner, in which the lateral faces of the tenon lie at right angles to the face of the shoulder at the end of the spoke, I form an inclined shoulder which lies at an angle to the lateral faces of the spoke and its tenon, and this inclined shoulder rests or bears against a correspondingly-inclined surface within the metallic seat, whereby the bearing or contact surface between the seat and spoke is increased with a view to strengthening the spoke and tenon to a still further degree than is afforded by a simple annular or hollow seat. The seat preferably corresponds to the contour of the spoke in cross-section, and it (the seat) is secured in place on the hub by means of tapering or wedge-shaped prongs that are made integral with the seat, and are adapted to be forced or driven into the hub to firmly hold the metallic seat in proper position on the exterior face of the hub.

To enable others to more readily understand my invention, I will now proceed to a detailed description thereof in connection with the accompanying drawings, in which—

Figure 1:
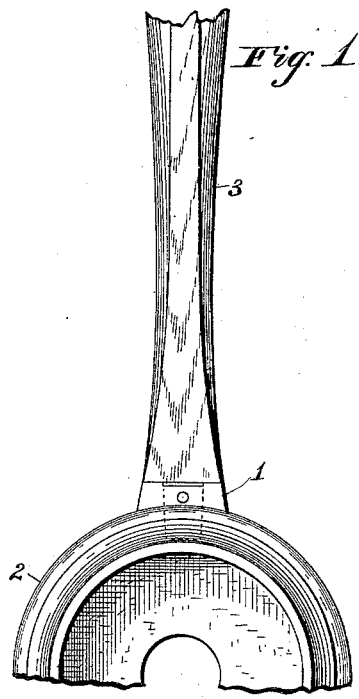
Figure 2:
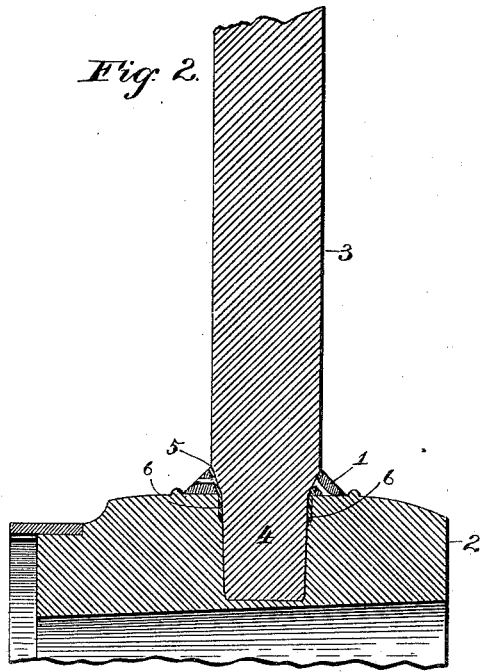
Figure 3:
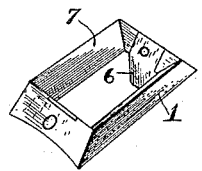
Figure 4:
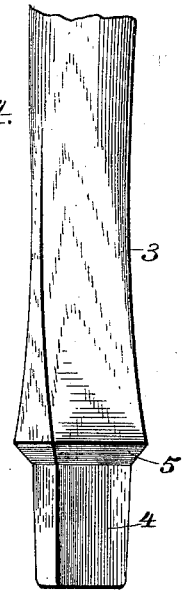

Figure 1 is an elevation showing a part of a hub and a spoke with my improved seat or socket applied thereto. Fig. 2 is a central sectional view through the same. Fig. 3 is a detail perspective view of the seat or socket detached from the hub and spoke, and Fig. 4 is a detail view of the spoke and its tenon.

Like numerals of reference denote corresponding parts in all the figures of the drawings, referring to which—

1 designates my metallic spoke seat or socket, which is adapted to be secured exteriorly to a hub 2 and fitted around the tenon of the spoke 3.

The hub is or may be of the common ordinary form well known to the art and has sockets for the spokes, and the spoke 3 is formed with a tenon 4, which is of the same character as the ordinary spoke, with this important variation, to wit: Instead of making the face of the shoulder 5 abrupt and at right angles to the lateral face of the spoke and the tenon, I make said shoulder 5 at an angle to the lateral faces of said spoke and tenon. The angle of this inclined shoulder may vary as is most desirable or convenient; but I preferably make said shoulder at an angle of forty-five degrees (45°) to said lateral faces. This inclined shoulder extends continuously around the spoke at the juncture of the tenon therewith, and it is made integral with the spoke.

The seat of socket 1 is made or cast in a single piece of metal, and it preferably conforms to the contour or shape of the spoke in cross-section—that is, it is rectangular—in order to fit snugly around the spoke and tenon. The seat is made with integral prongs or wedge-shaped teeth 6 on its under or concealed face, and these tapering prongs are driven or forced into the hub when the seat or socket is applied thereto, in order to firmly secure the seat exteriorly to the hub. Within the seat is formed an inclined shoulder or support 7, which extends continuously around the opening therein and the inclination of which corresponds to that of the shoulder 5 on the spoke.

By an inspection of Fig. 2 of the drawing, it will be noticed that the tenon of the spoke passes through the fixed seat and enters the socket or mortise in the hub, that the metallic exterior seat 1 fits snugly around the tenon at its juncture with the body of the spoke, and that the inclined shoulder on the spoke bears firmly against the corresponding support or shoulder on the metallic seat.

A comparatively large bearing-surface for the spoke and its seat is thus secured, and the spoke is very materially strengthened and braced at is weakest point, while a neat finish is secured to the joint.

The parts are extremely simple and durable in construction, cheap of manufacture, and reliable in service. The seat or socket may be made ornamental, if desired, and changes in the form and proportion of parts made without departing from the spirit or sacrificing the advantages of my invention.

Having thus fully described my invention, what I claim as new, and desire to secure by Letters Patent, is—

1. The combination, with a hub, of a spoke having an inclined shoulder at the line of juncture of the tenon with the body of the spoke, and an independent fixed seat or socket for each spoke having a corresponding shoulder which receives the shoulder on the spoke, substantially as described.

2. The combination, with a hub, of a spoke having the inclined shoulder 5, formed integrally therewith at the line of juncture of the tenon with the body of the spoke and lying at an angle to the lateral faces of the spoke and its tenon, and an independent seat or socket fitted around each tenon and having an interior flange which is inclined to correspond to and receive the shoulder on the spoke, substantially as described.

3. The combination, with a hub and a spoke, of a metallic seat or socket fitted around the spoke and having the tapering prongs which enter the hub and firmly secure the socket or seat exteriorly to said hub, substantially as described.

4. A seat or socket for spokes cast in a single piece of metal and having the interior flange or shoulder, and the prongs which extend therefrom substantially at right angles to the plane of said flange or shoulder, as set forth.

In testimony whereof I affix my signature in presence of two witnesses.

JAMES R. McALISTER.

Witnesses:
D. D. SIMONS,
JAMES WALSH.